United States Patent
Choi

(10) Patent No.: US 11,768,485 B2
(45) Date of Patent: Sep. 26, 2023

(54) SYSTEM AND METHOD FOR CONTROLLING QUALITY OF VEHICLE

(71) Applicants: HYUNDAI MOTOR COMPANY, Seoul (KR); Kia Corporation, Seoul (KR)

(72) Inventor: Byung Il Choi, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 67 days.

(21) Appl. No.: 17/479,448

(22) Filed: Sep. 20, 2021

(65) Prior Publication Data

US 2022/0308565 A1 Sep. 29, 2022

(30) Foreign Application Priority Data

Mar. 25, 2021 (KR) .......................... 10-2021-0039182

(51) Int. Cl.
*G05B 19/418* (2006.01)

(52) U.S. Cl.
CPC ................. *G05B 19/41875* (2013.01); *G05B 2219/32368* (2013.01)

(58) Field of Classification Search
None
See application file for complete search history.

(56) References Cited

U.S. PATENT DOCUMENTS

| | | | |
|---|---|---|---|
| 4,433,385 A * | 2/1984 | De Gasperi | G06T 7/001 348/130 |
| 5,027,295 A * | 6/1991 | Yotsuya | G06T 7/70 348/126 |
| 5,321,619 A * | 6/1994 | Matsuda | G05B 19/41865 235/375 |
| 5,815,198 A * | 9/1998 | Vachtsevanos | G06T 7/001 348/125 |
| 10,481,579 B1 * | 11/2019 | Putman | G06Q 10/0639 |
| 11,117,328 B2 * | 9/2021 | Hough | G06N 3/088 |
| 11,156,982 B2 * | 10/2021 | Putman | G05B 19/4183 |
| 11,209,795 B2 * | 12/2021 | Putman | G05B 19/41805 |
| 11,244,262 B2 * | 2/2022 | Walker | G06Q 10/0635 |
| 2007/0177787 A1 * | 8/2007 | Maeda | G06T 7/001 382/141 |
| 2009/0198464 A1 * | 8/2009 | Clarke | G05B 19/41875 702/81 |
| 2014/0247347 A1 * | 9/2014 | McNeill | G06F 18/24133 382/103 |
| 2015/0310674 A1 * | 10/2015 | Humphrey | G06Q 10/20 701/1 |

(Continued)

FOREIGN PATENT DOCUMENTS

CN 102354210 A * 2/2012
CN 111814113 A * 10/2020

*Primary Examiner* — Jason Lin
(74) *Attorney, Agent, or Firm* — Morgan, Lewis & Bockius LLP

(57) ABSTRACT

A system for controlling a quality of a vehicle includes: a communication device that communicates with a plurality of terminals respectively located on vehicle product lines; and a controller that monitors the part assembly state of the worker, and displays an official assembly video of a defectively assembled part through a terminal on a product line where the worker is located when detecting the defective assembly of the worker.

14 Claims, 6 Drawing Sheets

(56) References Cited

U.S. PATENT DOCUMENTS

| | | | |
|---|---|---|---|
| 2016/0188980 A1* | 6/2016 | Martin | G11B 27/005 |
| | | | 382/103 |
| 2021/0109690 A1* | 4/2021 | Weaver | G06F 3/1282 |
| 2021/0118066 A1* | 4/2021 | Walker | G06Q 10/06315 |

* cited by examiner

SYSTEM AND METHOD FOR CONTROLLING QUALITY OF VEHICLE

CROSS-REFERENCE TO RELATED APPLICATION

This application claims the benefit of priority to Korean Patent Application No. 10-2021-0039182, filed in the Korean Intellectual Property Office on Mar. 25, 2021, the entire contents of which are incorporated herein by reference.

TECHNICAL FIELD

The present disclosure relates to a technology for improving quality of part assembly of a worker located on a vehicle product line.

BACKGROUND

In general, global complete vehicle manufacturers are producing from millions to tens of millions of vehicles annually. In addition, vehicles with various specifications are being developed to meet customer needs. Continuous development of production technology is underway to maximize a production efficiency and a production quality.

In order to produce a complete vehicle, it is necessary to assemble a number of parts, and automation of equipment therefor is being made, but still, workers assemble the majority of the parts by hand. Therefore, when an assembly quality of the worker is low, that is, when the worker has assembled the part arbitrarily without assembling the part using a prescribed assembly method, a gap or a level difference may occur between the assembled part and a part adjacent to the assembled part.

When a problem occurs in the assembly quality as such, an additional work of the worker is required, and a possibility of damage resulted from detachment/mounting of the part increases in a work process. In particular, in a case of a part located inside an engine room, a time required for such part increases further, and thus, the possibility of damage to the part increases further.

A conventional method for solving such assembly quality problem of the vehicle is limited to a level at which a product quality manager directly visits the assembly worker one by one and requests recurrence prevention. Thus, real-time feedback is impossible, and it is difficult to improve the actual assembly quality.

The matters described in this background are written to enhance an understanding of the background of the disclosure, which may include matters other than the prior art already known to those of ordinary skill in the field to which this technology belongs.

SUMMARY

The present disclosure has been made to solve the above-mentioned problems occurring in the prior art while advantages achieved by the prior art are maintained intact.

An aspect of the present disclosure provides a system and a method for controlling a quality of a vehicle that monitor a part assembly state of a worker, warn the worker through a terminal on a product line where the worker is located when detecting a defective assembly of the worker, and display an official assembly video of a part on which the defective assembly has occurred, thereby giving real-time feedback to the worker, and substantially improving a part assembly quality of the worker.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling a quality of a vehicle includes a communication device that communicates with a plurality of terminals respectively located on vehicle product lines, and a controller that monitors a part assembly state of a worker, and displays an official assembly video of a defectively assembled part through a terminal on a product line where the worker is located when detecting the defective assembly of the worker.

In one implementation, the controller may count the number of times the defective assembly of the worker is detected.

In one implementation, the controller may set a warning intensity based on the counted number of times, and output a warning signal corresponding to the set warning intensity through the terminal on the product line where the worker is located.

In one implementation, the controller may detect at least one of a case where the worker has mounted a part of a different specification, a case where a gap between a part mounted by the worker and an adjacent part exceeds a standard value, a case where a level difference between the part mounted by the worker and the adjacent part exceeds a standard value, a case where there is a crack or a scratch on the part mounted by the worker, a case where the part mounted by the worker does not operate normally, and/or a case where a connector of the part mounted by the worker is not fastened as the defective assembly of the worker.

In one implementation, the controller may obtain information on a process where the defective assembly of the part has occurred, a specification of a vehicle where the defective assembly of the part has occurred, and a worker who caused the defective assembly of the part based on product line process classification data, personal information of a worker for each product line process, data on a part to be worked on for each process, data on a problem part, problem phenomena data, problem classification data, problem occurrence time point data, data on a work process of the problem part, data on an optional specification for each vehicle, and information on a list of mounted parts for each vehicle.

In one implementation, the controller may output a warning signal through the terminal on the product line where the worker is located during working hours of the worker based on the obtained information.

In one implementation, the controller may extract an official assembly video of the defectively assembled part from an educational video, and display the extracted official assembly video through the terminal on the product line where the worker is located.

In one implementation, the controller may extract the official assembly video of the defectively assembled part from the educational video based on text data of the defectively assembled part and image data of the defectively assembled part.

In one implementation, the controller may calculate a first degree of similarity by comparing text data of the defectively assembled part with subtitle data included in the educational video, calculate a second degree of similarity by comparing an image of the defectively assembled part with the educational video, and extract the official assembly video of the defectively assembled part based on the calculated first degree of similarity and second degree of similarity.

In one implementation, the controller may extract a frame in the educational video with a K value calculated based on a following [Equation 1] exceeding a threshold value as the official assembly video of the defectively assembled part.

According to an aspect of the present disclosure, a method for controlling a quality of a vehicle includes monitoring, by a controller, a part assembly state of a worker located on a vehicle product line, detecting, by the controller, a defective assembly of the worker, selecting, by the controller, a terminal corresponding to a location of the worker, displaying, by the controller, an official assembly video of a defectively assembled part through the selected terminal, and outputting, by the controller, a warning signal through the selected terminal.

In one implementation, the outputting of the warning signal through the selected terminal may include setting a warning intensity based on the number of times the defective assembly of the worker has occurred, and outputting a warning signal corresponding to the set warning intensity through the selected terminal.

In one implementation, the detecting of the defective assembly of the worker may include detecting at least one of a case where the worker has mounted a part of a different specification, a case where a gap between a part mounted by the worker and an adjacent part exceeds a standard value, a case where a level difference between the part mounted by the worker and the adjacent part exceeds a standard value, a case where there is a crack or a scratch on the part mounted by the worker, a case where the part mounted by the worker does not operate normally, and/or a case where a connector of the part mounted by the worker is not fastened as the defective assembly of the worker.

In one implementation, the selecting of the terminal corresponding to the location of the worker may include obtaining information on a process where the defective assembly of the part has occurred, a specification of a vehicle where the defective assembly of the part has occurred, and a worker who caused the defective assembly of the part based on product line process classification data, personal information of a worker for each product line process, data on a part to be worked on for each process, data on a problem part, problem phenomena data, problem classification data, problem occurrence time point data, data on a work process of the problem part, data on an optional specification for each vehicle, and information on a list of mounted parts for each vehicle.

In one implementation, the outputting of the warning signal through the selected terminal may include outputting the warning signal through the selected terminal during working hours of the worker based on the obtained information.

In one implementation, the displaying of the official assembly video of the defectively assembled part through the selected terminal may include extracting an official assembly video of the defectively assembled part from an educational video, and displaying the extracted official assembly video through the selected terminal.

In one implementation, the extracting of the official assembly video of the defectively assembled part may include extracting the official assembly video of the defectively assembled part from the educational video based on text data of the defectively assembled part and image data of the defectively assembled part.

In one implementation, the extracting of the official assembly video of the defectively assembled part may include calculating a first degree of similarity by comparing text data of the defectively assembled part with subtitle data included in the educational video, calculating a second degree of similarity by comparing an image of the defectively assembled part with the educational video, and extracting the official assembly video of the defectively assembled part based on the calculated first degree of similarity and second degree of similarity.

In one implementation, the extracting of the official assembly video of the defectively assembled part based on the calculated first degree of similarity and second degree of similarity may include extracting a frame in the educational video with a K value calculated based on a following [Equation 1] exceeding a threshold value as the official assembly video of the defectively assembled part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
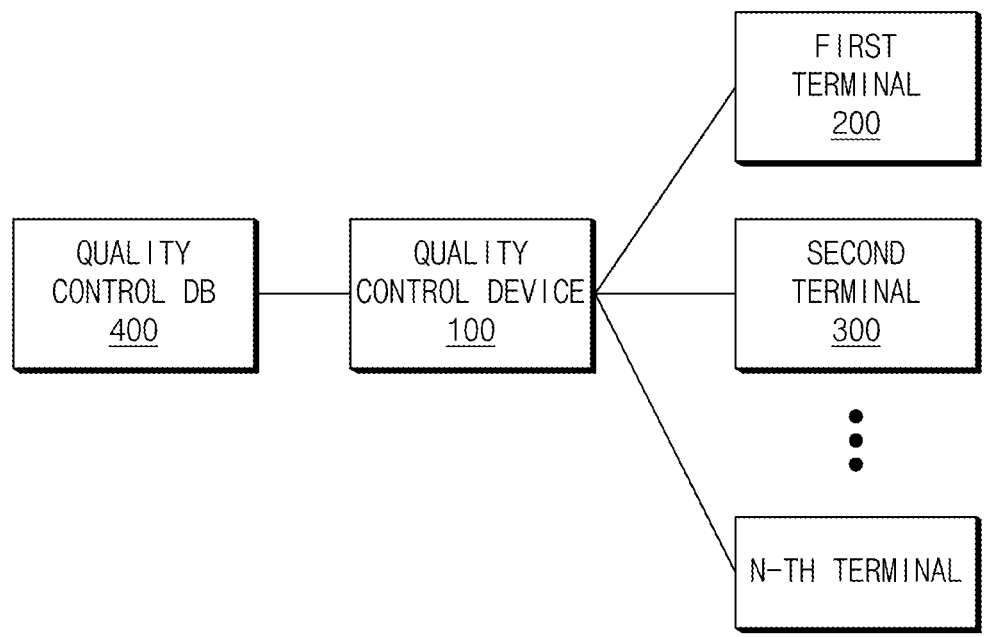
FIG. 1 is a block diagram of a system for controlling a quality of a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a system for controlling a quality of a vehicle according to an embodiment of the present disclosure.

As shown in FIG. 1, a system for controlling a quality of a vehicle according to an embodiment of the present disclosure may include a quality control device 100, a plurality of terminals 200 and 300 respectively located on product lines, and a quality control database (DB) 400.

For example, the quality control device 100 may be implemented in a form of a server, and may monitor a part assembly state of a worker, visually or aurally warn the worker through a terminal on a product line where the worker is located when detecting a defective assembly of the worker, and display an official assembly video of a part on which the defective assembly has occurred.

The quality control device 100 may detect a case in which the worker has mounted a part of a different specification, a case in which a gap between a part mounted by the worker and an adjacent part exceeds a standard value, a case in which a level difference between the part mounted by the worker and the adjacent part exceeds a standard value, a case in which there is a crack or a scratch on the part mounted by the worker, a case in which the part mounted by the worker does not operate normally (for example, a case in which a communication error has occurred in an electronic control unit (ECU)), a case in which a connector of the part mounted by the worker is not fastened (for example, a case in which a diagnostic trouble code (DTC) has occurred because a connector of the ECU is not fastened), and the like as the defective assembly of the worker.

The quality control device 100 may count the number of times the defective assembly of the worker has occurred, and may set an intensity of the warning differently based on the counted number of times.

The quality control device 100 may extract the official assembly video of the part on which the defective assembly has occurred from an educational video, and transmit the extracted official assembly video to the terminal on the product line where the worker is located. That is, the quality control device 100 may display the extracted official assembly video through the terminal on the product line where the worker is located. In this connection, the educational video refers to an exemplary video made to educate the worker about part assembly.

The plurality of terminals 200 and 300 may display the entire educational video (a video for helping the worker located on the product line assemble the part) received from the quality control device 100 in a wired or wireless manner, or an official assembly video of a specific part.

The plurality of terminals 200 and 300 may include a first display that displays the entire educational video or the official assembly video of the specific part, a second display that displays the visual warning for the worker, and an output device that outputs the audible warning for the worker. In this connection, the visual warning displayed through the second display may be implemented to be displayed by the first display.

The quality control DB 400 may store data required in a process of determining whether the assembly state of the part assembled by the worker is normal or defective, data required in the process of warning the worker through the terminal on the product line where the worker is located, and data required in the process of displaying the official assembly video of the part on which the defective assembly has occurred. Hereinafter, a detailed configuration of the quality control DB 400 will be described in detail with reference to FIG. 2.

Figure 2:
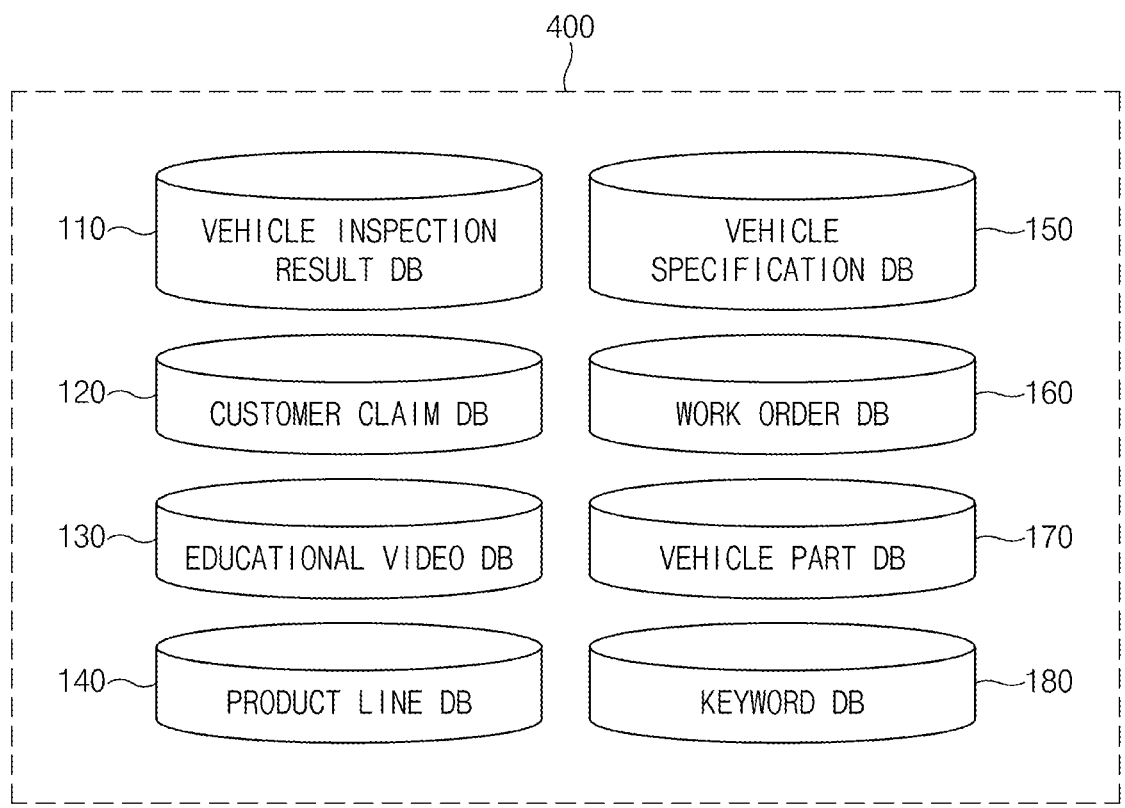
FIG. 2 is an exemplary view showing a detailed configuration of a quality control database (DB) in a system for controlling a quality of a vehicle according to an embodiment of the present disclosure.

FIG. 2 is an exemplary view showing a detailed configuration of a quality control DB in a system for controlling a quality of a vehicle according to an embodiment of the present disclosure.

As shown in FIG. 2, the quality control DB 400 in the system for controlling the quality of the vehicle according to an embodiment of the present disclosure may include a vehicle inspection result DB 110, a customer claim DB 120, an educational video DB 130, a product line DB 140, a vehicle specification DB 150, a work order DB 160, a vehicle part DB 170, and a keyword DB 180. In this connection, the DBs may be integrated into one DB.

The vehicle inspection result DB 110 may, for example, store data as shown in [Table 1] below as data on a result of vehicle inspection.

TABLE 1

| Vehicle inspection result DB | Problem part<br>Problem phenomenon<br>Problem classification (assembly, part, design, and the like)<br>Problem occurrence time point<br>Work process of problem part<br>Personal information of corresponding process worker at problem part work time point<br>Problem vehicle information (vehicle type, VIN (vehicle identification number), optional specification, and the like)<br>Number of times problem has occurred |
|---|---|

The customer claim DB 120 may, for example, store data as shown in [Table 2] below as data on a claim of a customer.

TABLE 2

| Customer claim DB | Specification information of claim occurred vehicle (e.g., VIN, optional specification, and the like)<br>Claim occurred part<br>Claim problem<br>Claim cause<br>Number of occurrences for each claim<br>Claim classification<br>Claim action result |
|---|---|

The educational video DB 130 may, for example, store video data as shown in [Table 3] below as video data educating the worker on a method for assembling a part.

TABLE 3

| Educational video DB | Part to be worked on for each process<br>Work method, posture, and tool used for part to be worked on for each process<br>Precautions during work of part to be worked on for each process<br>Information for educating worker about other part work |
|---|---|

The product line DB 140 may, for example, store data as shown in [Table 4] below as product line related-data.

TABLE 4

| Product line DB | Product line UPH (Unit Per Hour)<br>Product line process classification: process A, process B, . . . , process Z<br>Personal information of worker for each product line process<br>Product line equipment present condition and information<br>Product line buggy present condition and information<br>Other product line related-information |
|---|---|

The vehicle specification DB 150 may, for example, store data as shown in [Table 5] below as data on a specification of the vehicle.

TABLE 5

| Vehicle specification DB | Optional specification for each vehicle<br>List of mounted parts for each vehicle |
|---|---|

The work order DB 160 may, for example, store data as shown in [Table 6] below as work-related data.

TABLE 6

| Work order DB | Part to be worked on for each process<br>Work method for each process<br>Work posture for each process<br>Required time for work of each process |
|---|---|

The vehicle part DB 170 may, for example, store data shown in [Table 7] below as vehicle part-related data.

TABLE 7

| Vehicle part DB | Real image of vehicle part<br>3D modeling image of vehicle part<br>Gap and level difference specifications between adjacent parts<br>Adjacent part pattern |
|---|---|

The keyword DB 180 may, for example, store data shown in [Table 8] below as part term-related data.

TABLE 8

| Keyword DB | Part term dictionary: Representative term, synonym, stop word, and the like |
|---|---|

In the above [Table 8], a representative term for each part may be matched with a synonym and a stop word.

Figure 3:
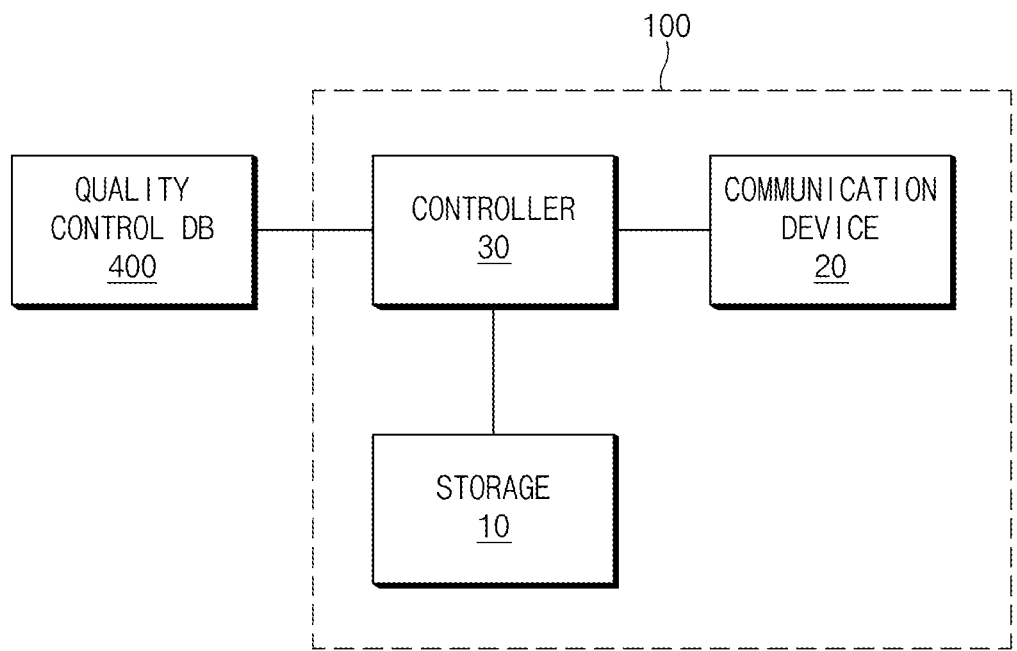
FIG. 3 is a block diagram of a device for controlling a quality of a vehicle according to an embodiment of the present disclosure.

FIG. 3 is a block diagram of a device for controlling a quality of a vehicle according to an embodiment of the present disclosure.

As shown in FIG. 3, the quality control device 100 of the vehicle according to an embodiment of the present disclosure may include storage 10, a communication device 20, and a controller 30. In this connection, components may be combined with each other to be implemented as one component or some components may be omitted depending on a method for implementing the quality control device 100 of the vehicle according to an embodiment of the present disclosure.

Each of the components will be described. First, the storage 10 may store various logics, algorithms, and programs required in the process of monitoring the part assembly state of the worker, visually or aurally warning the worker through the terminal on the product line where the worker is located when detecting the defective assembly of the worker, and displaying the official assembly video of the part on which the defective assembly has occurred.

The storage 10 may store a table in which an intensity of warning corresponding to the number of times C the defective assembly of the worker has occurred. As an example, the table is as shown in [Table 9] below.

TABLE 9

|  | Visual warning | Audible warning | |
|---|---|---|---|
|  | Pop-up message color | Warning time | Warning level |
| Step 1 ($C \leq 3$) | Yellow | 3 seconds | 5 |
| Step 2 ($3 < C \leq 6$) | Orange | 5 seconds | 10 |
| Step 3 ($6 < C$) | Red | 10 seconds | 15 |

Such storage 10 may include at least one type of recording media (storage media) of a memory of a flash memory type, a hard disk type, a micro type, a card type (e.g., a secure digital card (SD card) or an eXtream digital card (XD card)), and the like, and a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The communication device 20, which is a module that provides a communication interface with the plurality of terminals 200 and 300 located on the product line, may transmit the entire educational video and the official assembly video of the specific part to the plurality of terminals 200 and 300.

The communication device 20 may transmit a warning signal (a warning pop-up window, a warning sound, and the like) to the plurality of terminals 200 and 300.

The communication device 20 may include a wired communication module and a wireless communication module to communicate with the plurality of terminals 200 and 300. In this connection, the wireless communication module may include at least one of a mobile communication module, a wireless Internet module, and/or a short-range communication module.

The mobile communication module may communicate with the terminal through a mobile communication network built based on technical standards or communication schemes for mobile communication (e.g., a global system for mobile communication (GSM), a code division multi access (CDMA), a code division multi access 2000 (CDMA2000), an enhanced voice-data optimized or enhanced voice-data only (EV-DO), a wideband CDMA (WCDMA), a high speed downlink packet access (HSDPA), a high speed uplink packet access (HSUPA), a long term evolution (LTE), a long term evolution-advanced (LTEA), and the like), 4th generation mobile telecommunication (4G), and 5th generation mobile telecommunication (5G).

The wireless Internet module, which is a module for wireless Internet access, may communicate with the terminal through a wireless LAN (WLAN), a wireless-fidelity (Wi-Fi), a wireless fidelity (Wi-Fi) Direct, a digital living network alliance (DLNA), a wireless broadband (WiBro), a world interoperability for microwave access (WiMAX), a high speed downlink packet access (HSDPA), a high speed uplink packet access (HSUPA), a long term evolution (LTE), a long term evolution-advanced (LTE-A), and the like.

The short-range communication module may support short-range communication using at least one of technologies of a Bluetooth™, a radio frequency identification (RFID), an infrared data association (IrDA), an ultra wideband (UWB), a ZigBee, a near field communication (NFC), and/or a wireless universal serial bus (Wireless USB).

The controller 30 may perform overall control such that each of the components may normally perform a function thereof. Such a controller 30 may be implemented in a form of hardware, software, or a combination of the hardware and the software. Preferably, the controller 30 may be implemented as a microprocessor or electronic control unit (ECU), but may not be limited thereto.

In particular, the controller 30 may monitor the part assembly state of the worker based on the quality control DB 400, and transmit the official assembly video of the part on which the defective assembly has occurred to the terminal on the product line where the worker is located when the defective assembly of the worker is detected. That is, the controller 30 may display the official assembly video of the part on which the defective assembly has occurred through the terminal on the product line where the worker is located. In this connection, the controller 30 may visually and aurally warn the worker. For example, the controller 30 may visually and audibly warn the worker based on the [Table 9].

The controller 30 may monitor the part assembly state of the worker based on the vehicle inspection result DB 110. In this connection, the controller 30 may detect the case in which the worker has mounted the part of the different specification, the case in which the gap between the part mounted by the worker and the adjacent part exceeds the standard value, the case in which the level difference between the part mounted by the worker and the adjacent part exceeds the standard value, the case in which there is the crack or the scratch on the part mounted by the worker, the case in which the part mounted by the worker does not operate normally (for example, the case in which the communication error has occurred in the electronic control unit (ECU)), the case in which the connector of the part mounted by the worker is not fastened (for example, the case in which the diagnostic trouble code (DTC) has occurred because the connector of the ECU is not fastened), and the like as the defective assembly of the worker.

The controller 30 may count the number of times the defective assembly of the worker has occurred, and store the counted number of times in the vehicle inspection result DB 110.

The controller 30 may obtain information on a process in which the defective assembly of the part has occurred, a specification of a vehicle in which the defective assembly of the part has occurred, and a worker who caused the defective assembly of the part. For example, the controller 30 may obtain the information on the process in which the defective assembly of the part has occurred, the specification of the vehicle in which the defective assembly of the part has occurred, and the worker who caused the defective assembly of the part based on the product line process classification data and the personal information of the worker for each product line process stored in the product line DB 140, the data on the part to be worked on for each process stored in the work order DB 160, the data on the problem part stored, the problem phenomena data, the problem classification (the assembly, the part, the design) data, the problem occurrence time point data, and the data on the work process of the problem part in the vehicle inspection result DB 110, the data on the optional specification for each vehicle, and the information on the list of the mounted parts for each vehicle stored in the vehicle specification DB 150.

The controller 30 may transmit the warning signal to the terminal on the product line where the worker is located at during working hours of the worker based on the obtained worker information. That is, the controller 30 may output the warning signal through the terminal on the product line where the worker is located during the working hours of the worker based on the obtained worker information.

The controller 30 may extract the official assembly video of the part on which the defective assembly has occurred from the educational video, and transmit the extracted official assembly video to the terminal on the product line where the worker is located. That is, the controller 30 may extract the official assembly video of the part on which the defective assembly has occurred from the educational video, and display the extracted official assembly video through the terminal on the product line where the worker is located. In this connection, the controller 30 may transmit the official assembly video of the part to the terminal on the product line where the worker is located during the working hours of the worker based on the obtained worker information.

Hereinafter, with reference to FIG. 4, the process of extracting, by the controller 30, the official assembly video of the part on which the defective assembly has occurred from the educational video will be described in detail.

Figure 4:
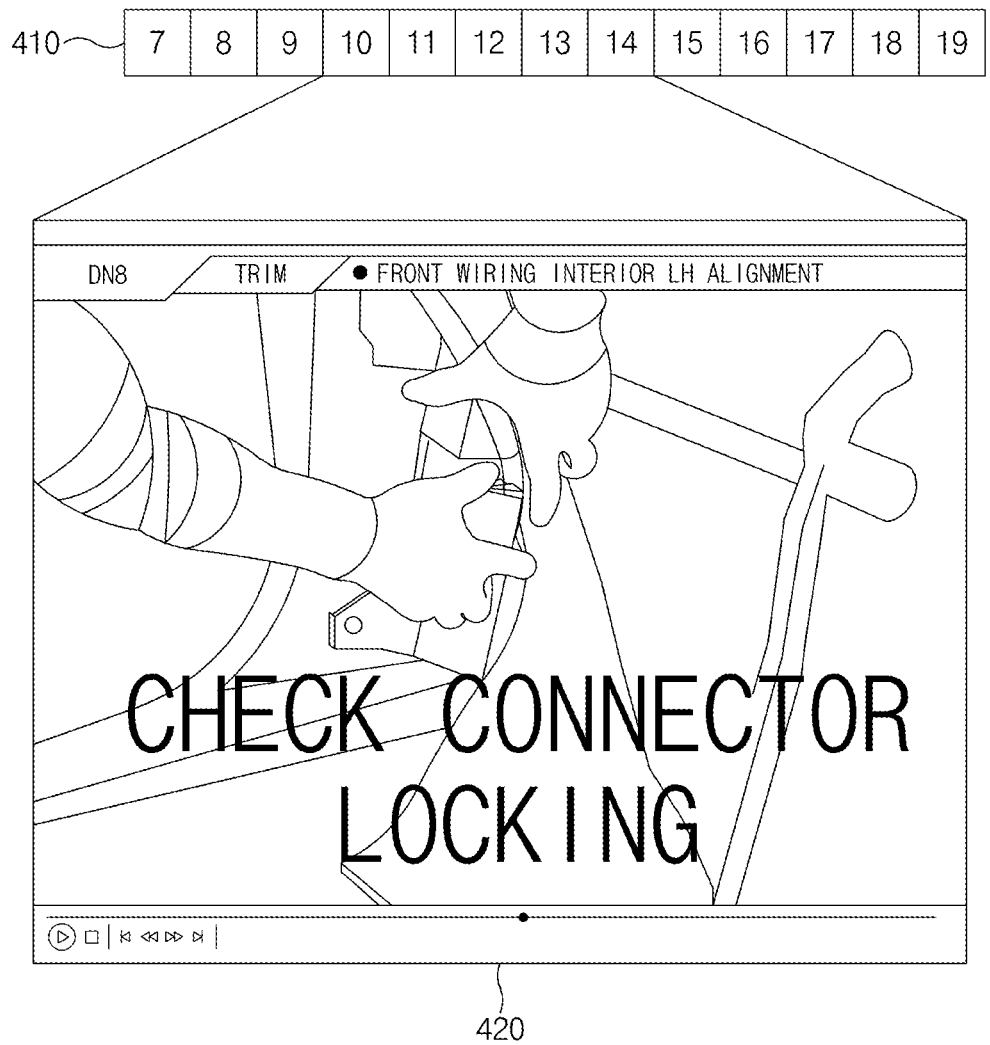
FIG. 4 is an exemplary view of an educational video stored in an educational video DB in a quality control DB in a system for controlling a quality of a vehicle according to an embodiment of the present disclosure.

FIG. 4 is an exemplary view of an educational video stored in an educational video DB in a quality control DB in a system for controlling a quality of a vehicle according to an embodiment of the present disclosure.

In FIG. 4, "410" represents each frame of the educational video, and "420" represents a video corresponding to each frame. In this connection, "420" is a video that changes from frame to frame, but is represented as a single video for better understanding.

The controller 30 may calculate a first degree of similarity by comparing text data (e.g., a name, a state, and the like) of the part on which the defective assembly has occurred with subtitle data included in the educational video, and calculate a second degree of similarity by comparing image data (the real image, the 3D modeling image, and the like) of the part on which the defective assembly has occurred with educational video data.

For example, when the text data of the part on which the defective assembly has occurred is 'front wiring connector not fastened' and when the video 420 corresponding to frames 10 to 14 of the educational video contains subtitle data such as front, wiring, connector, locking, and the like, the controller 30 may calculate the first degree of similarity by comparing the text data with the subtitle data in the video for each frame on the basis of the 'front', the 'wiring', the 'connector', and the 'not fastened'.

The controller 30 may extract the official assembly video of the part on which the defective assembly has occurred from the educational video based on the calculated first degree of similarity "A" and second degree of similarity "B". As an example, the controller 30 may extract a frame in which a value "K" calculated through a following [Equation 1] exceeds a threshold value (e.g., 8) as the official assembly video of the part on which the defective assembly has occurred.

$$K = \omega_1 \times A + \omega_2 \times B \qquad \text{[Equation 1]}$$

Here, $\omega_1$ denotes a constant as a weight for the first degree of similarity, and $\omega_2$ denotes a constant as a weight for the second degree of similarity.

The "K" value thus calculated is shown in [Table 10] below as an example.

TABLE 10

| Frame ... | 9 | 10 | 11 | 12 | 13 | 14 | 15 | ... |
|---|---|---|---|---|---|---|---|---|
| A | 0.42 | 0.88 | 0.88 | 0.88 | 0.88 | 0.88 | 0.66 | |
| B | 0.66 | 0.92 | 0.92 | 0.92 | 0.92 | 0.92 | 0.77 | |
| K | 5.64 | 9.04 | 9.04 | 9.04 | 9.04 | 9.04 | 7.26 | |

As may be seen through the [Table 10], "K" values of the frames 10 to 14 exceed the threshold value. Thus, the controller 30 may extract a video of the frames 10 to 14 as the official assembly video of the part on which the defective assembly has occurred, and transmit the video of the frames 10 to 14 to the terminal on the product line where the worker is located.

Figure 5:
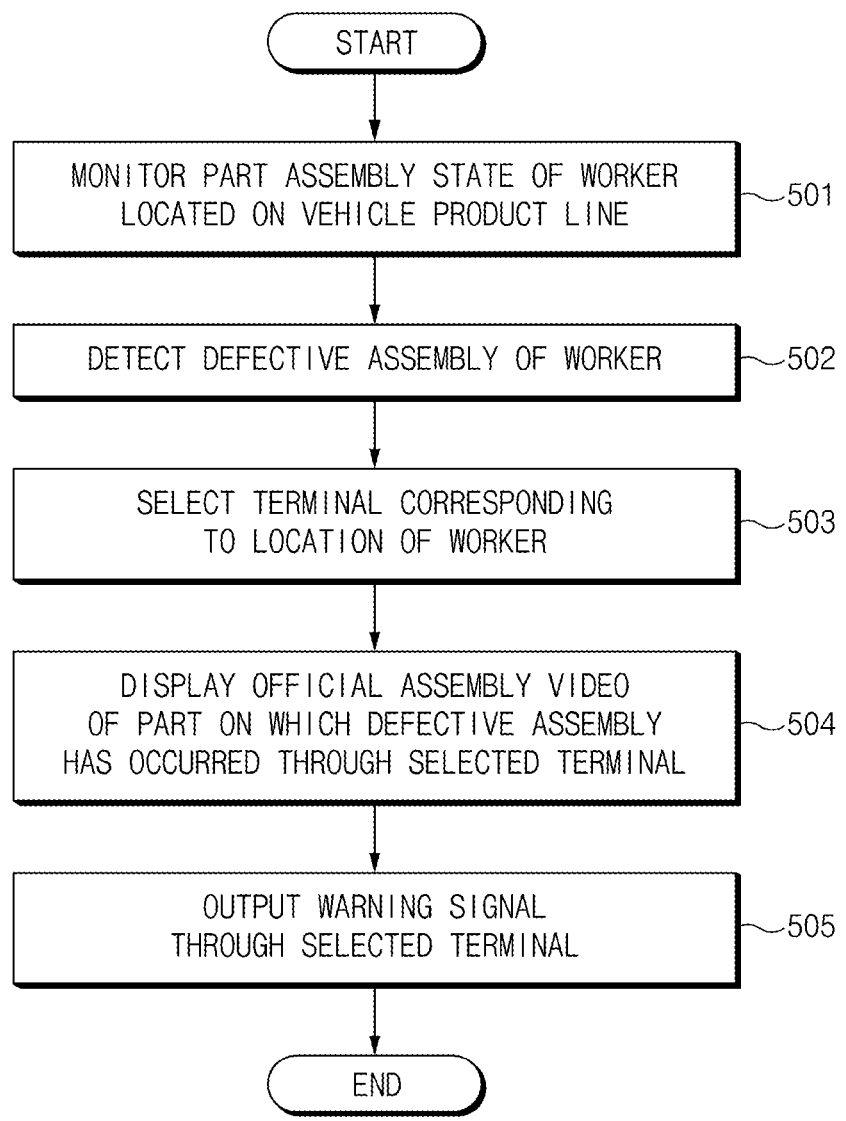
FIG. 5 is a flowchart of a method for controlling a quality of a vehicle according to an embodiment of the present disclosure.

FIG. 5 is a flowchart of a method for controlling a quality of a vehicle according to an embodiment of the present disclosure.

First, the controller 30 monitors the part assembly state of the worker located on the vehicle product line (501).

Thereafter, the controller 30 detects the defective assembly of the worker (502).

Thereafter, the controller 30 selects a terminal corresponding to a location of the worker (503).

Thereafter, the controller 30 displays the official assembly video of the part on which the defective assembly has occurred through the selected terminal (504).

Then, the controller 30 outputs the warning signal through the selected terminal (505).

Figure 6:
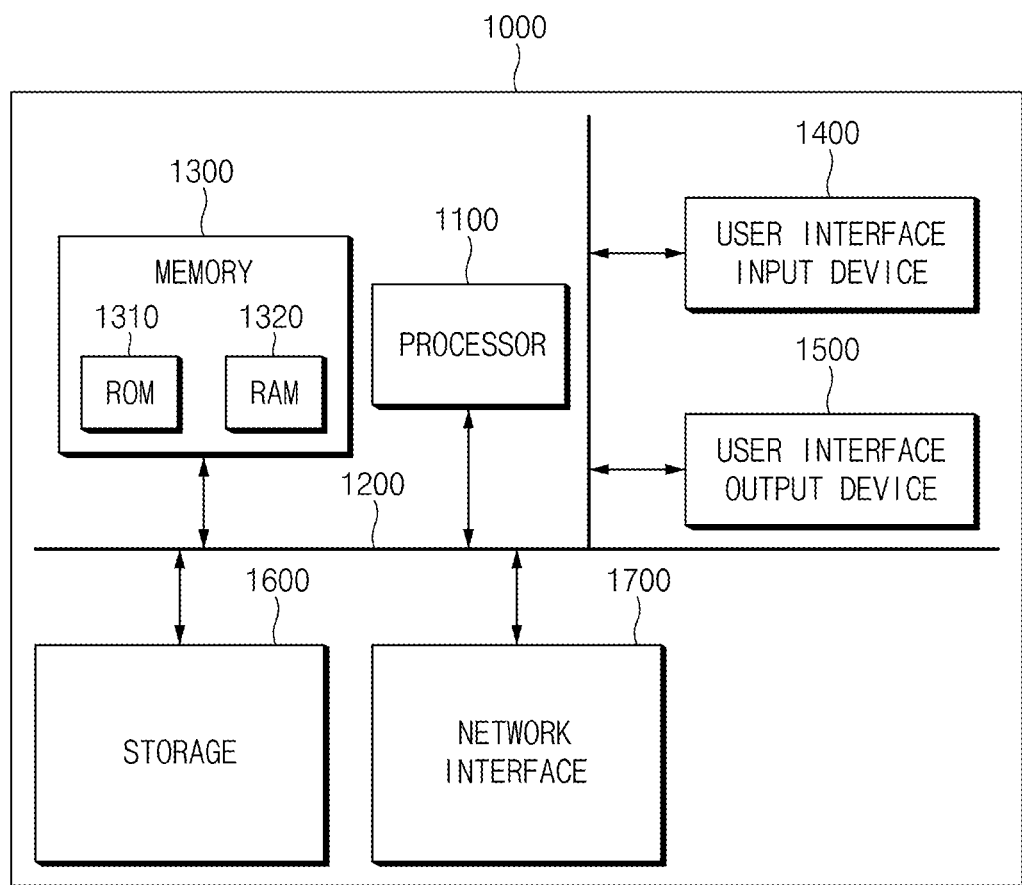
FIG. 6 is a block diagram showing a computing system for executing a method for controlling a quality of a vehicle according to an embodiment of the present disclosure.

FIG. 6 is a block diagram showing a computing system for executing a method for controlling a quality of a vehicle according to an embodiment of the present disclosure.

With reference to FIG. 6, the method for controlling the quality of the vehicle according to an embodiment of the present disclosure described above may also be implemented with a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The system and the method for controlling the quality of the vehicle according to an embodiment of the present disclosure as described above may monitor the part assembly state of the worker, warn the worker through the terminal on the product line where the worker is located when detecting the defective assembly of the worker, and display the official assembly video of the part on which the defective assembly has occurred, thereby giving the real-time feedback to the worker, and substantially improving the part assembly quality of the worker.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a quality of a vehicle, the device comprising:
   a controller configured to:
   monitor a part assembly state of a worker; and
   display an official assembly video of a defectively assembled part through a terminal on a product line where the worker is located when detecting defective assembly of the worker,
   wherein the controller is configured to:
   extract an official assembly video of the defectively assembled part from an educational video; and
   display the extracted official assembly video through the terminal on the product line where the worker is located, and
   wherein the controller is configured to:
   calculate a first degree of similarity by comparing text data of the defectively assembled part with subtitle data included in the educational video;
   calculate a second degree of similarity by comparing an image of the defectively assembled part with the educational video; and
   extract the official assembly video of the defectively assembled part based on the calculated first degree of similarity and second degree of similarity.

2. The device of claim 1, wherein the controller is configured to count a number of times the defective assembly of the worker is detected.

3. The device of claim 2, wherein the controller is further configured to:
   set a warning intensity based on the counted number of times; and output a warning signal corresponding to the set warning intensity through the terminal on the product line where the worker is located.

4. The device of claim 1, wherein the controller is configured to detect at least one of a case where the worker has mounted a part of a different specification, a case where a gap between a part mounted by the worker and an adjacent part exceeds a standard value, a case where a level difference between the part mounted by the worker and the adjacent part exceeds a standard value, a case where there is a crack or a scratch on the part mounted by the worker, a case where the part mounted by the worker does not operate normally, or a case where a connector of the part mounted by the worker is not fastened as the defective assembly of the worker.

5. The device of claim 1, wherein the controller is configured to obtain information on a process where the defective assembly of the part has occurred, a specification of a vehicle where the defective assembly of the part has occurred, and a worker who caused the defective assembly of the part based on product line process classification data, personal information of a worker for each product line process, data on a part to be worked on for each process, data on a problem part, problem phenomena data, problem classification data, problem occurrence time point data, data on a work process of the problem part, data on an optional specification for each vehicle, and information on a list of mounted parts for each vehicle.

6. The device of claim 5, wherein the controller is configured to output a warning signal through the terminal on the product line where the worker is located during working hours of the worker based on the obtained information.

7. The device of claim 1, wherein the controller is configured to extract a frame in the educational video with a K value calculated based on a following [Equation] exceeding a threshold value as the official assembly video of the defectively assembled part:

$$K = \omega_1 \times A + \omega_2 \times B \qquad \text{[Equation]}$$

wherein A denotes the first degree of similarity, B denotes the second degree of similarity, $\omega_1$ denotes a constant as a weight for the first degree of similarity, and $\omega_2$ denotes a constant as a weight for the second degree of similarity.

8. A method for controlling a quality of a vehicle, the method comprising:
monitoring, by a controller, a part assembly state of a worker located on a vehicle product line;
detecting, by the controller, a defective assembly of the worker;
selecting, by the controller, a terminal corresponding to a location of the worker;
displaying, by the controller, an official assembly video of a defectively assembled part through the selected terminal; and
outputting, by the controller, a warning signal through the selected terminal,
wherein the displaying of the official assembly video of the defectively assembled part through the selected terminal includes:
extracting an official assembly video of the defectively assembled part from an educational video; and
displaying the extracted official assembly video through the selected terminal, and
wherein the extracting of the official assembly video of the defectively assembled part includes:
calculating a first degree of similarity by comparing text data of the defectively assembled part with subtitle data included in the educational video;
calculating a second degree of similarity by comparing an image of the defectively assembled part with the educational video; and
extracting the official assembly video of the defectively assembled part based on the calculated first degree of similarity and second degree of similarity.

9. The method of claim 8, wherein the outputting of the warning signal through the selected terminal includes:
setting a warning intensity based on the number of times the defective assembly of the worker has occurred; and
outputting a warning signal corresponding to the set warning intensity through the selected terminal.

10. The method of claim 8, wherein the detecting of the defective assembly of the worker includes detecting at least one of a case where the worker has mounted a part of a different specification, a case where a gap between a part mounted by the worker and an adjacent part exceeds a standard value, a case where a level difference between the part mounted by the worker and the adjacent part exceeds a standard value, a case where there is a crack or a scratch on the part mounted by the worker, a case where the part mounted by the worker does not operate normally, or a case where a connector of the part mounted by the worker is not fastened as the defective assembly of the worker.

11. The method of claim 8, wherein the selecting of the terminal corresponding to the location of the worker includes obtaining information on a process where the defective assembly of the part has occurred, a specification of a vehicle where the defective assembly of the part has occurred, and a worker who caused the defective assembly of the part based on product line process classification data, personal information of a worker for each product line process, data on a part to be worked on for each process, data on a problem part, problem phenomena data, problem classification data, problem occurrence time point data, data on a work process of the problem part, data on an optional specification for each vehicle, and information on a list of mounted parts for each vehicle.

12. The method of claim 11, wherein the outputting of the warning signal through the selected terminal includes outputting the warning signal through the selected terminal during working hours of the worker based on the obtained information.

13. The method of claim 12, wherein the warning signal includes a visual warning signal and an audible warning signal.

14. The method of claim 8, wherein the extracting of the official assembly video of the defectively assembled part based on the calculated first degree of similarity and second degree of similarity includes extracting a frame in the educational video with a K value calculated based on a following [Equation] exceeding a threshold value as the official assembly video of the defectively assembled part:

$$K = \omega_1 \times A + \omega_2 \times B \qquad \text{[Equation]}$$

wherein A denotes the first degree of similarity, B denotes the second degree of similarity, $\omega_1$ denotes a constant as a weight for the first degree of similarity, and $\omega_2$ denotes a constant as a weight for the second degree of similarity.

* * * * *